F. J. SPAULDING.
DETACHABLE CONNECTING LINK.
APPLICATION FILED NOV. 23, 1918.

1,346,611.

Patented July 13, 1920.

Inventor,
Fenton J. Spaulding,
by his Attorneys,

UNITED STATES PATENT OFFICE.

FENTON J. SPAULDING, OF CHICAGO, ILLINOIS, ASSIGNOR TO LINK-BELT COMPANY, OF CHICAGO, ILLINOIS, A CORPORATION OF ILLINOIS.

DETACHABLE CONNECTING-LINK.

1,346,611.   Specification of Letters Patent.   Patented July 13, 1920.

Application filed November 23, 1918. Serial No. 263,857.

*To all whom it may concern:*

Be it known that I, FENTON J. SPAULDING, a citizen of the United States, and a resident of Chicago, county of Cook, State of Illinois, have invented certain Improvements in Detachable Connecting-Links, of which the following is a specification.

My invention relates to certain improvements in detachable connecting links for drive chains.

One object of my invention is to provide means for readily securing the detachable pins to the link.

A further object of the invention is to provide a fastening device which is permanently secured to one of the links and which can be operated by one hand.

A still further object of the invention is to draw the shoulders of the pins firmly against the link.

In the accompanying drawings:—

Figure 1:
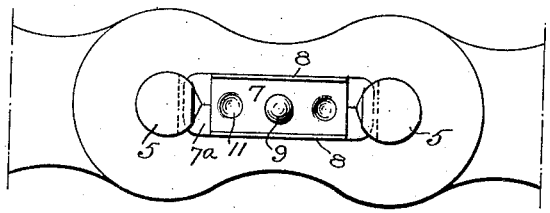
Figure 1, is a side view of sufficient of a drive chain to illustrate my invention, the present chain being of the roller type.

1, 1 are the links of the roller chain. 2, 2 are the rollers. 3 and 4 are the detachable connecting links and 5, 5 are the removable pivot pins, which extend through the links 1, 3 and 4, and also through the rollers 2. These pins have shoulders 12 and 13 and are headed as at 14 so as to rigidly secure the pins to the links 3, and have notches 6 at the opposite end, as shown.

Figure 2:
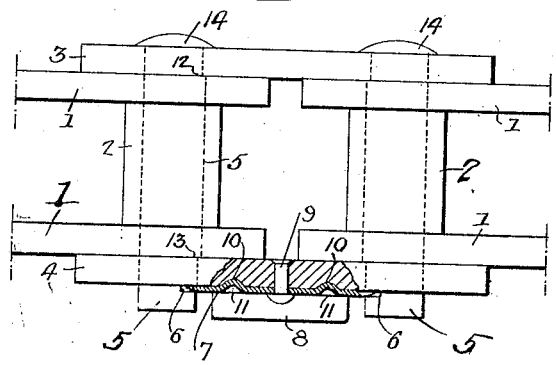
Fig. 2, is a plan view, partly in section.
Figure 4:
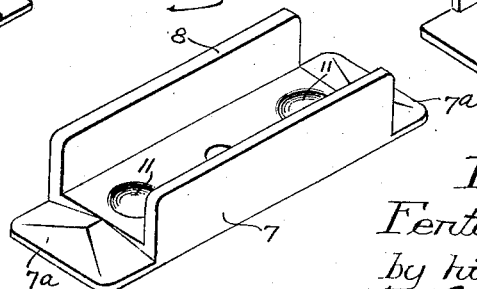
Fig. 4, is a detached perspective view of the fastening device.

7 is a locking plate made of sheet metal cut as shown in Fig. 4, and preferably bent to form flanges 8 at each side. This plate is perforated for the reception of the pivot pin 9, which extends through and is firmly riveted to the link 4, shown in Fig. 2. The pivoted plate 7 is of such a length that its ends extend into the notches 6 of the pivot pins when the plate is in the position illustrated in Figs. 1 and 2. As shown in Fig. 4, each end 7ª of the plate is tapered so that when the pins are passed through the openings in the link 4 and the plate 7 is turned, the tapered portion of the plate draws the pins so that the shoulder 13 will be firmly held against link 4. In order to retain the plate in position, I preferably form a recess 10 in the link 4 at one or both sides of the pivot 9 and form projections 11 on the plate 7, which spring into the recesses when the plate is in engagement with the pins 5, as shown in Figs. 1 and 2, thus preventing the accidental movement of the plate when the chain is in motion.

Figure 5:
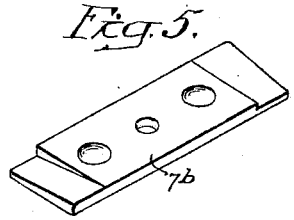
Figs. 5 and 6, are views of modifications of the fastening device.
Figure 6:
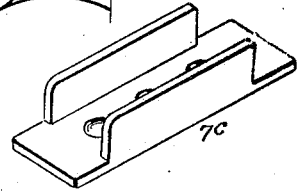

In Fig. 5, I have shown the plate 7ᵇ without the flanges, while in Fig. 6, I have shown a flanged plate 7ᶜ with flat ends of even thickness throughout, this construction may be used when the parts are made to accurately fit each other.

By providing the plate with comparatively deep projecting flanges the operator can obtain a firm grasp on the plate, so as to turn it into or out of the locking position and, consequently, the plate can have a neat fit in the notches in the pin, insuring the plate retaining its position under severe strains. Furthermore, a tool can be used to turn the plate, if found desirable, or a tool can be inserted between the flanges to turn it, should the parts become so stiff that they could not be turned by hand. These flanges materially stiffen the plate.

Figure 3:
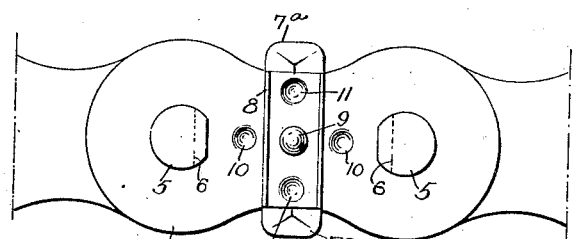
Fig. 3, is a side view similar to Fig. 1, showing the fastening device moved in position clear of the pins.

When it is desired to disconnect the links of the chain, all that is necessary is to turn the plate to the position shown in Fig. 3 and to withdraw the pins 5 from the link 4. When it is desired to connect the links of the chain again, all that is necessary is to insert the pins and to turn the plate so that its ends will enter the notches in the pins, locking the pins rigidly in position.

I claim:—

1. The combination in a detachable connection for chains, of two links; two pins attached to one of said links and extending through openings in the other link, each of said pins having a shoulder and a slot; and a plate pivoted to the link having the openings, said plate having tapered ends arranged to enter the slots in the pins and to draw the link firmly against the shoulders of the pins.

2. The combination in a detachable connection for chains, of two links; two pivot pins attached to one of said links and extending through openings in the said link, each pin being notched; and a plate pivotally connected to the last mentioned link between the pins and having projecting portions arranged to enter the notches in the pins, said plate having a flange.

3. The combination in a detachable connection for chains, of two links, two pivot pins projecting from one link and adapted to openings in the other link, said pivot pins having notches; and a plate pivoted to the last mentioned link between the openings for the pins, said plate having a deep flange at each side, the flanges stopping short of the ends of the plate, the plate being so proportioned that the ends thereof will extend into the notches in the pins, said plate also having a projection adapted to a recess in the link and tending to hold the plate in the locked position.

4. The combination in a connecting device for chains, of a link; two pivot pins riveted to said link, each of said pins having a shoulder and a lateral slot at the opposite end; a second link having openings through which the pins extend, the shoulders of the pins resting against the inner surfaces of the last mentioned link; and a pivoted flanged plate having tapered ends which enter the slots when the plate is turned, drawing the link to which it is attached firmly against the shoulders of the pins, said plate having means for securing it in its locked position.

In witness whereof I affix my signature.

FENTON J. SPAULDING.